US008281380B2

(12) United States Patent
Ogawa

(10) Patent No.: US 8,281,380 B2
(45) Date of Patent: Oct. 2, 2012

(54) INFORMATION PROCESSING SYSTEM AND COMPUTER-READABLE RECORDING MEDIUM

(75) Inventor: Hideharu Ogawa, Tokyo (JP)

(73) Assignee: Passlogy Co., Ltd., Tokyo (JP)

( * ) Notice: Subject to any disclaimer, the term of this patent is extended or adjusted under 35 U.S.C. 154(b) by 340 days.

(21) Appl. No.: 12/383,224

(22) Filed: Mar. 20, 2009

(65) Prior Publication Data

US 2009/0249447 A1    Oct. 1, 2009

(51) Int. Cl.
*H04L 29/06* (2006.01)
(52) U.S. Cl. ................................. 726/8; 726/2
(58) Field of Classification Search ............... 726/8
See application file for complete search history.

(56) References Cited

U.S. PATENT DOCUMENTS

| | | | | |
|---|---|---|---|---|
| 4,805,134 | A * | 2/1989 | Calo et al. | 1/1 |
| 5,615,649 | A * | 4/1997 | Yung | 123/146.5 B |
| 6,246,769 | B1 * | 6/2001 | Kohut | 380/45 |
| 7,150,038 | B1 * | 12/2006 | Samar | 726/8 |
| 2002/0049916 | A1 * | 4/2002 | Nozaki et al. | 713/202 |
| 2003/0061503 | A1 * | 3/2003 | Katz et al. | 713/200 |
| 2005/0050148 | A1 * | 3/2005 | Mohammadioun et al. | 709/206 |

FOREIGN PATENT DOCUMENTS

| | | |
|---|---|---|
| JP | 2003-256373 | 9/2003 |
| JP | 2005-122469 | 5/2005 |
| JP | 2005-196800 | 7/2005 |

OTHER PUBLICATIONS

Office Action dated Dec. 13, 2011 in counterpart Japanese application No. 2006-243761.

* cited by examiner

*Primary Examiner* — Kaveh Abrishamkar
*Assistant Examiner* — Ngoc D Nguyen
(74) *Attorney, Agent, or Firm* — Ohlandt, Greeley, Ruggiero & Perle, LLP

(57) ABSTRACT

When a user makes a remote log-in to a server apparatus from a terminal apparatus, a password managing apparatus, which manages the name of a user of the server apparatus, his/her direct log-in password and transformation rule, displays an authentication purpose symbol sequence on a display apparatus. The user transforms the displayed sequence by his/her transformation rule and supplies, via the terminal apparatus, his/her user name and the post-transformation symbol sequence to the server apparatus, which then sends them to the password managing apparatus. If the result of applying the user's transformation rule to any authentication purpose symbol sequence generated in the past coincides with the post-transformation symbol sequence, the password managing apparatus sends the direct log-in password to the server apparatus to pass the remote log-in to the server apparatus by the terminal apparatus as a success.

9 Claims, 6 Drawing Sheets

INFORMATION PROCESSING SYSTEM AND COMPUTER-READABLE RECORDING MEDIUM

BACKGROUND OF THE INVENTION

1. Field of the Invention

The present invention relates to an information processing system suitable for safe password authentication by a password managing apparatus on a terminal apparatus that makes a remote log-in to a server apparatus, and to a computer-readable information recording medium that stores a program for realizing the server apparatus or the password managing apparatus that constitutes the information processing system.

2. Description of the Related Art

Techniques that allow a terminal apparatus to make a remote log-in to a server apparatus via a computer communication network have conventionally been proposed.

Users can make a direct log-in to a server apparatus by using an input/output device that is directly connected to the server apparatus. Users can also use any other kind of computer that is connected to the server apparatus via the Internet or the like as their terminal, and can access the server apparatus from this terminal apparatus, which provides a remote desktop.

That is, the remote desktop relays an input entered by the users from the terminal apparatus to the server apparatus, and displays the result output from the server apparatus on the terminal apparatus.

Meanwhile, user authentication techniques that have conventionally been proposed include password authentication using a one-way hash function and authentication using a predetermined transformation rule. Such authentication techniques are disclosed in Patent Literature 1 identified later.

According to the technique disclosed in Patent Literature 1, a password deriving pattern for each user is pre-registered in an authentication server. When a user intends to use a system, the authentication server generates a presentation pattern and presents it to the user to let the user enter a password corresponding to the user's password deriving pattern in response to the presentation pattern, authenticates the entered password based on the presentation pattern presented and the user's pre-registered password deriving pattern, and notifies the authentication result to the system of which use is intended.

A "domain" technique in which a plurality of computers use a common user name and a common password has also been proposed. In such a "domain", a password managing apparatus that manages the password notifies an authentication result to each computer.

[Patent Literature 1] Unexamined Japanese Patent Application KOKAI Publication No. 2005-196800

In a case where the technique disclosed in Patent Literature 1 is applied to a remote desktop service, it is often insufficient for a server apparatus (corresponding to the "system of which use is intended" of Patent Literature 1) to only receive an authentication result from a password managing apparatus (corresponding to the "authentication server" of Patent Literature 1).

Particularly, in a case where the server apparatus encrypts a file system by using a password assigned to a given user, the server apparatus has to somehow acquire the very password of the user.

Also in a case where a server apparatus and a password managing apparatus are independently operated and managed, e.g., in a case where they are managed by different bodies, a safe remote log-in is highly requested.

The present invention aims for solving the above problem, and an object of the present invention is to provide an information processing system suitable for safe password authentication by a password managing apparatus on a terminal apparatus that makes a remote log-in to a server apparatus, and a computer-readable information recording medium that stores a program for realizing the server apparatus or the password managing apparatus that constitutes the information processing system.

SUMMARY OF THE INVENTION

To solve the above problem, the following invention will be disclosed in accordance with the principle of the present invention.

An information processing system according to a first aspect of the present invention includes a server apparatus, a password managing apparatus, a display apparatus, and a terminal apparatus, which are configured as follows.

The server apparatus includes a log-in permission determining unit, a data processing unit, a direct log-in entry receiving unit, a direct processing unit, a remote log-in request receiving unit, a password request sending unit, a password response receiving unit, a remote log-in response sending unit, and a remote processing unit.

The password managing apparatus includes a user information storage unit, a symbol sequence request receiving unit, a symbol sequence generating unit, a symbol sequence retaining unit, a symbol sequence response sending unit, a password request receiving unit, a provision determining unit, and a password response sending unit.

The display apparatus includes a symbol sequence request sending unit, a symbol sequence response receiving unit, and a symbol sequence displaying unit.

The terminal apparatus includes a remote log-in entry receiving unit, a remote log-in request sending unit, a remote log-in response receiving unit, and a terminal relay unit.

In the server apparatus: the log-in permission determining unit determines whether or not to permit a log-in to the server apparatus based on the combination of a user name and a password that are supplied thereto; the data processing unit performs, in response to an instruction entry that is given by a user who is permitted by the log-in permission determining unit to log in, data processing corresponding to the instruction entry, and outputs the result of the data processing as a process output; the direct log-in entry receiving unit receives an entry of a user name and a password of a direct user; and the direct processing unit supplies the combination of the user name and the password that are entered to the log-in permission determining unit, and when it is determined that a log-in to the server apparatus is permitted, receives an instruction entry from the direct user, supplies the instruction entry to the data processing unit, and presents the direct user with a process output that is output by the data processing unit in response to the instruction entry.

In the password managing apparatus, the user information storage unit stores a user name, a password assigned to the user name, and a transformation rule assigned to the user name in association.

In the display apparatus, the symbol sequence request sending unit sends an authentication purpose symbol sequence request to the password managing apparatus.

In the password managing apparatus: the symbol sequence request receiving unit receives the authentication purpose symbol sequence request sent by the display apparatus; the symbol sequence generating unit generates an authentication purpose symbol sequence in response to the received authentication purpose symbol sequence request; the symbol sequence retaining unit retains the generated authentication purpose symbol sequence until a predetermined elapse time passes; and the symbol sequence response sending unit sends an authentication purpose symbol sequence response in which the generated authentication purpose symbol sequence is specified to the display apparatus.

Here, the method by which the symbol sequence generating unit generates an authentication purpose symbol sequence may be (p) a method of randomly selecting and arranging a plurality of symbols, or (q) a method of randomly selecting any of a plurality of predetermined authentication purpose symbol sequence prospects, or (r) a method of applying a predetermined conversion to the present time.

In the display apparatus: the symbol sequence response receiving unit receives the authentication purpose symbol sequence response sent by the password managing apparatus; and the symbol sequence displaying unit displays the authentication purpose symbol sequence specified in the received authentication purpose symbol sequence response.

In the terminal apparatus: the remote log-in entry receiving unit receives an entry of a user name of a remote user who uses the terminal apparatus, and of a post-transformation symbol sequence that is obtained by the remote user by transforming the authentication purpose symbol sequence displayed on the display apparatus based on a transformation rule assigned to the user name; and the remote log-in request sending unit sends a remote log-in request in which the user name and the post-transformation symbol sequence that are entered are specified to the server apparatus.

In the server apparatus: the remote log-in request receiving unit receives the remote log-in request sent by the terminal apparatus; and the password request sending unit sends a password request in which the user name and the post-transformation symbol sequence that are specified in the received remote log-in request are specified to the password managing apparatus.

In the password managing apparatus: the password request receiving unit receives the password request sent by the server apparatus; the provision determining unit determines whether a password provision condition is satisfied or not; and the password response sending unit sends, in a case where it is determined that the password provision condition is satisfied, a password response in which the password that is stored in association with the user name specified in the received password request is specified to the server apparatus.

Here, the password provision condition is satisfied in a case where any of the results of applying the transformation rule stored in association with the user name specified in the received password request to each of authentication purpose symbol sequences that are retained coincides with the post-transformation symbol sequence specified in the received password request.

In the server apparatus: the password response receiving unit receives the password response sent by the password managing apparatus; and the remote log-in response sending unit supplies the combination of the user name specified in the received remote log-in request and the password specified in the received password response to the log-in permission determining unit, and sends a remote log-in response for permitting a remote log-in to the terminal apparatus, in a case where the log-in permission determining unit determines to permit a log-in to the server apparatus.

In the terminal apparatus: the remote log-in response receiving unit receives the remote log-in response sent by the server apparatus; and the terminal relay unit receives, in a case where a remote log-in by the remote user who uses the terminal apparatus is successful, an instruction entry directed by the remote user to the server apparatus from the remote user, relays the instruction entry to the server apparatus, receives a process output directed by the server apparatus to the remote user from the server apparatus, and presents the process output to the remote user.

Here, the terminal relay unit determines that a remote log-in by the remote user who uses the terminal apparatus is successful, in a case where the remote log-in response is received.

In the server apparatus, the remote processing unit supplies the instruction entry from the remote user that is relayed by the terminal apparatus to the data processing unit, and relays the process output that is output by the data processing unit in response to the instruction entry to the terminal apparatus to present the process output to the remote user.

In the information processing system according to the present invention, in the password managing apparatus, a password stored in the user information storage unit may be an encrypted password obtained by applying a predetermined encryption, and in the server apparatus, the remote log-in response sending unit may supply the combination of the user name specified in the received remote log-in request and a decrypted password obtained by decrypting the encrypted password specified in the received password response by a decryption manner corresponding to the predetermined encryption to the log-in permission determining unit.

In the information processing system according to the present embodiment, the server apparatus may further include a new password entry receiving unit and a new password registration request sending unit, and the password managing apparatus may further include a new password registration request receiving unit, and a new password updating unit, which may be configured as follows.

In the server apparatus: the new password entry receiving unit receives an entry of a user name and a password that is newly assigned to the user name; the new password registration request sending unit sends a new password registration request in which the entered user name, and an encrypted password obtained by encrypting the entered newly assigned password by the predetermined encryption are specified to the password managing apparatus; and the log-in permission determining unit determines to permit a log-in to the server apparatus, in a case where it is supplied with the combination of the entered user name and the entered newly assigned password.

In the password managing apparatus: the new password registration request receiving unit receives the new password registration request sent by the server apparatus; and the new password updating unit updates the user information storage unit by storing the user name specified in the received new password registration request in association with the encrypted password specified in the received new password registration request.

In the information processing system according to the present invention, the predetermined encryption may be performed based on a passphrase assigned to the user concerned. In the terminal apparatus, the remote log-in entry receiving unit may receive an entry of a passphrase assigned to the user concerned, in addition to an entry of the user name and the post-transformation symbol sequence. The remote log-in response sending unit may supply the combination of the user name specified in the received remote log-in request, and a decrypted password obtained by decrypting the encrypted password specified in the received password response based on the entered passphrase to the log-in permission determining unit.

In the information processing system according to the present invention, in the password managing apparatus: the user information storage unit may further store, in association with the user name, an identifier symbol of the display apparatus assigned to the user name; the symbol sequence retaining unit may retain the generated authentication purpose symbol sequence in association with the identifier symbol of a sender of the received authentication purpose symbol sequence request, and the password provision condition may be satisfied in a case where the result of applying the transformation rule stored in association with the user name specified in the received password request to the authentication purpose symbol sequence retained in association with the identifier symbol stored in association with the user name specified in the received password request coincides with the post-transformation symbol sequence specified in the received password request.

In the information processing system according to the present invention, the terminal apparatus may also function as the display apparatus.

A program according to another aspect of the present invention controls a computer to function as each unit of the server apparatus in the above-described information processing system.

A program according to another aspect of the present invention controls a computer to function as each unit of the password managing apparatus in the above-described information processing system.

The program according to the present invention may be stored on a computer-readable information recording medium such as a compact disk, a flexible disk, a hard disk, a magneto-optical disk, a digital video disk, a magnetic tape, a semiconductor memory, etc.

The program may be distributed and sold via a computer communication network independently from a computer on which the program will be executed. The information recording medium may be distributed and sold independently from a computer.

According to the present invention, it is possible to provide an information processing system suitable for safe password authentication by a password managing apparatus on a terminal apparatus that makes a remote log-in to a server apparatus, and a computer-readable information recording medium that stores a program for realizing the server apparatus or the password managing apparatus that constitutes the information processing system.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Embodiment of the present invention will now be explained below, but the embodiment explained below is intended for illustration, not to limit the scope of the present invention. Hence, although those skilled in the art could employ embodiment obtained by replacing individual components or all the components of the embodiment below with equivalents of those, such embodiments will also be included in the scope of the present invention.

Figure 1:
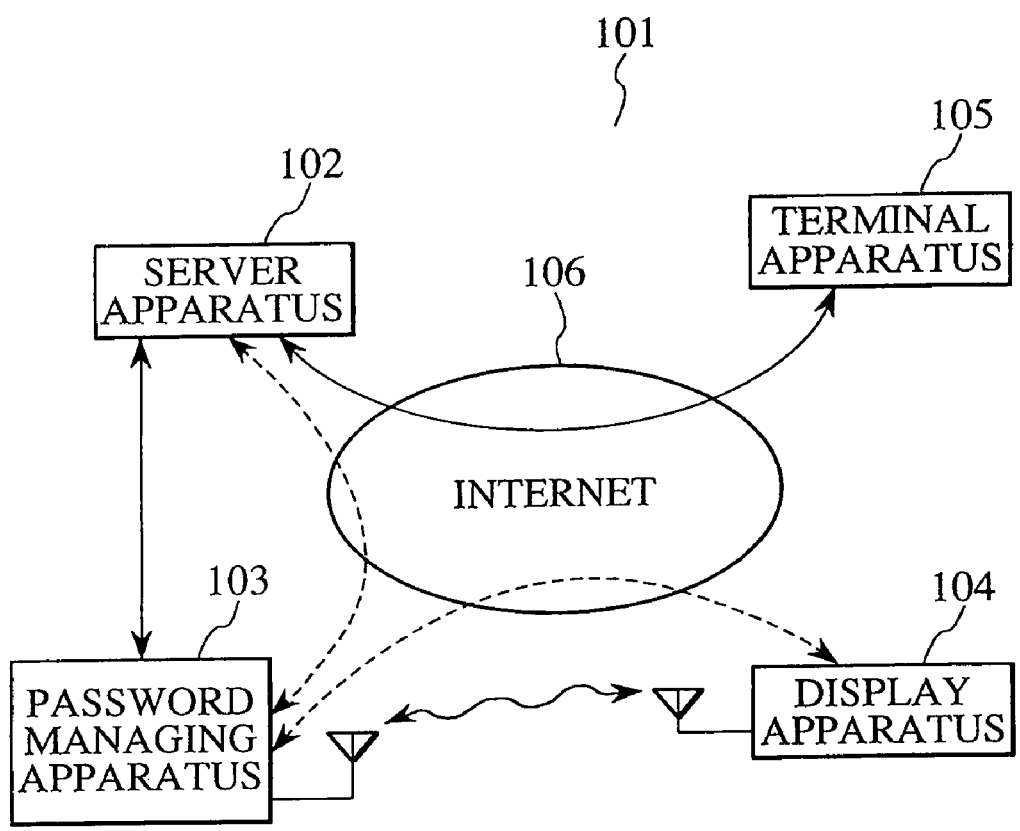
FIG. 1 is an explanatory diagram showing a schematic configuration of an information processing system according to an embodiment of the present invention.

FIG. 1 is an explanatory diagram showing a schematic configuration of an information processing system according to an embodiment of the present invention. The following explanation will be given with reference to FIG. 1.

An information processing system 101 includes a server apparatus 102, a password managing apparatus 103, a display apparatus 104, and a terminal apparatus 105.

The server apparatus 102 and the terminal apparatus 105 are connected via the Internet 106 so they can communicate. Typically, the server apparatus 102 is a server that provides a remote desktop service or a remote log-in service.

A user uses a personal computer owned at his/her home, a laptop computer brought to clients' premises, a computer provided at a net café or the like as the terminal apparatus 105 to access and make a log-in to the server apparatus 102 from a remote place, issue various instructions to the server apparatus 102 via the terminal apparatus 105, and have the result of each job performed by the server apparatus 102 displayed on the screen of the terminal apparatus 105.

Hence, the present embodiment can be used to improve the security level of user authentication for a log-in using telnet, rlogin, or ssh/slogin.

Typically, the server apparatus 102 and the password managing apparatus 103 are connected via a secure communication line such as a private line. However, even if they are connected via the Internet 106, they can safely send and receive passwords according to an embodiment described later.

The password managing apparatus 103 is kind of a log-in server that collectively manages passwords for making accesses and logs-in to computers included in domains.

Conventionally, such log-in servers operate in such a way that a user name and password information are entered by a user from the terminal apparatus 105, sent to the server apparatus 102 once, and then forwarded to the password managing apparatus 103, which then determines whether or not to permit access and log-in and notifies the determination result to the server apparatus 102.

Hence, the server apparatus 102 can know the "bare password" that is entered by the user.

Therefore, the server apparatus 102 can use this "bare password" for encryption of a file system.

That is, when encrypting a set of files possessed by a given user, the server apparatus 102 generates an encryption key by random numbers. Then, the server apparatus 102 encrypts the set of files with the encryption key, which is to be stored in a hard disk.

The encryption key is further encrypted with the "bare password" that must be entered by the user before being stored in the hard sick, since there is a possibility that a problem that would endanger the security might arise if the encryption key is simply stored in the hard disk.

For the next log-in occasion, the "encrypted encryption key" stored in the hard disk is decrypted with the "bare password" of the user who is successfully authenticated to acquire the "encryption key", and encryption and decryption for accessing the encrypted file system of the user are performed with the use of this "encryption key".

It is possible to apply the present embodiment to such a conventional crypto file system, without changing the system but by applying a wrapper.

Meanwhile, for the determination of whether or not to permit a log-in, a method is employed that applies a predetermined one-way function (hash function) to a password at the time of password registration, and stores the return from the function in a hard disk in association with a user name. When authentication is necessary, whether or not to permit the access is determined based on whether the return from the predetermined one-way function applied to the password entered by the user coincides or not with that that is stored in the hard disk.

A cellular phone is typically used as the display apparatus 104, but a dedicated mobile display terminal may be used as it. The display apparatus 104 is connected to the password managing apparatus 103 via a certain kind of line so that they can communicate. Since a wireless Internet connection services are provided for cellular phones, the display apparatus 104 is typically connected to the password managing apparatus 103 via the Internet 106.

It is typical to use a keyboard and a display that are directly connected to the server apparatus 102, for setting a new user and his/her password to the server apparatus 102. However, such setting may be made from another computer that is (virtually) directly connected to the server apparatus 102 via an RS-232C interface, an in-house LAN, or the like. In the following explanation, for easier understanding, a case in which a direct access to the server apparatus 102 is by the keyboard and display that are directly connected to the server apparatus 102 will be taken up as an example.

In the present embodiment, the password managing apparatus 103 performs user authentication, and if the authentication is successful, provides the server apparatus 102 with the password of the user at the server apparatus 102.

There is a possibility that a security-endangering problem might happen if a "bare password" for making a direct log-in to the server apparatus 102 is entered from a terminal placed at a net café or the like that cannot be said to be too safe. However, according to the present embodiment, since there is no need of entering a bare password for making a remote access, it is possible to prevent such a problem. A detailed explanation will be given below.

(Direct Log-In Function of Server Apparatus)

Figure 2:
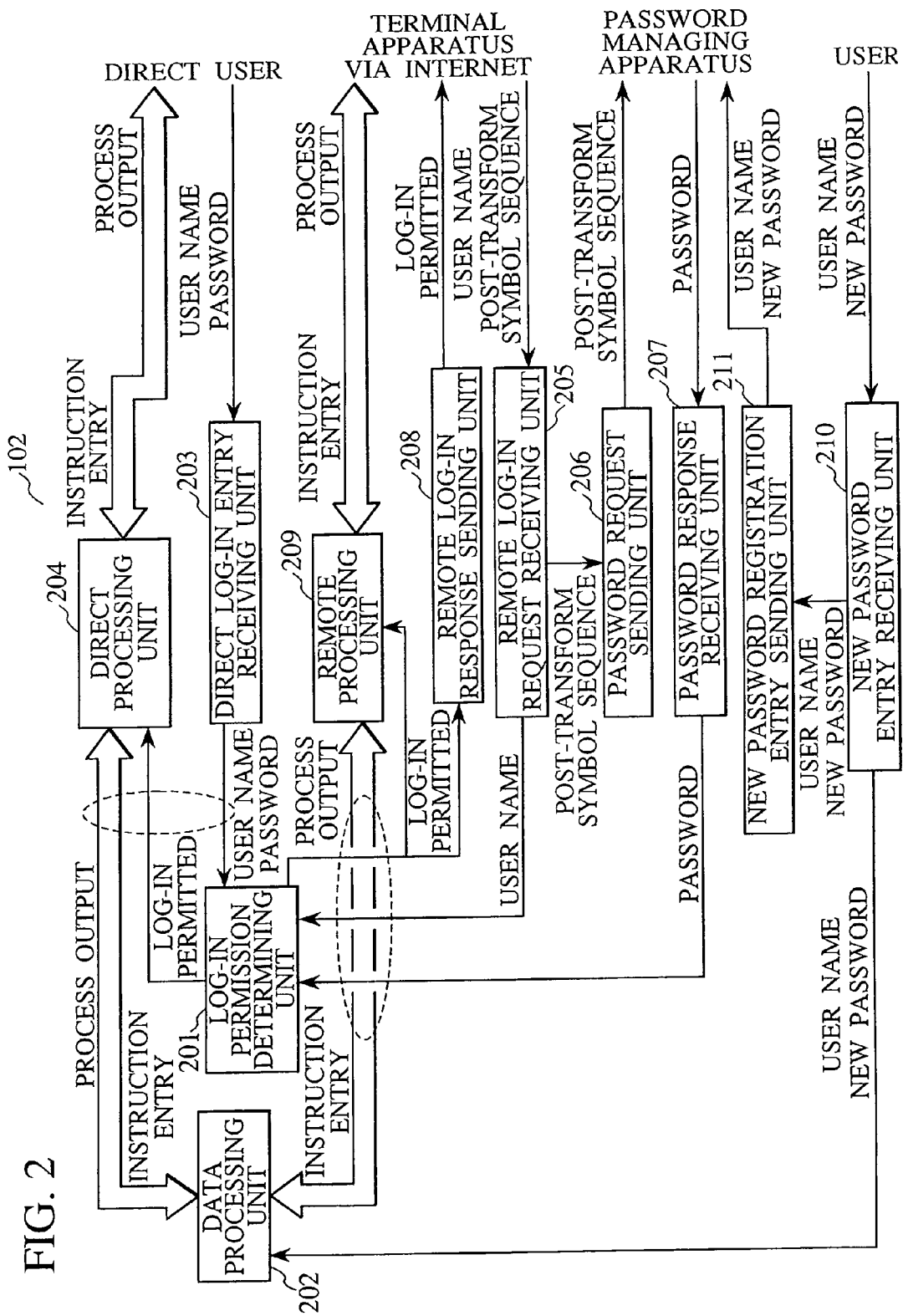
FIG. 2 is an explanatory diagram showing a schematic configuration of a server apparatus according to this embodiment.

FIG. 2 is an explanatory diagram showing a schematic configuration of the server apparatus according to the present embodiment. The following explanation will be given with reference to FIG. 2.

The server apparatus 102 includes a log-in permission determining unit 201, a data processing unit 202, a direct log-in entry receiving unit 203, a direct processing unit 204, a remote log-in request receiving unit 205, a password request sending unit 206, a password response receiving unit 207, a remote log-in response sending unit 208, a remote processing unit 209, a new password entry receiving unit 210, and a new password registration request sending unit 211.

The server apparatus 102 is equipped with components for performing access and log-in processes similar to those performed by a conventional computer system. These components are the log-in permission determining unit 201, the data processing unit 202, the direct log-in entry receiving unit 203, and the direct processing unit 204.

That is, the log-in permission determining unit 201 determines whether or not to permit a log-in to the server apparatus 102 based on a supplied combination of a user name and a password.

In a typical system, a user name, and a result of applying a one-way function to a password are stored in a password database provided in a hard disk of the server apparatus 102. Hence, the password of a given user is not to be stored in the hard disk or the like of the server apparatus 102 in its bare state.

The data processing unit 202 performs, in response to an instruction entry, data processing corresponding to the instruction entry, which is given by a user who is permitted by the log-in permission determining unit 201 to log in, and outputs the result of the data processing as a process output.

The data processing unit 202 performs general operations for making the server apparatus 102 function as a computer. In general, a computer can be considered as a black box that performs some operation in response to an instruction (input) from the user, and presents (outputs) the result of the operation to the user. In the present embodiment, what kind of processes a user who logs in to the server apparatus 102 performs at the server apparatus 102 can be arbitrarily changed based on the configuration of the data processing unit 202 provided in the server apparatus 102.

For example, the data processing unit 202 can be assigned for any arbitrary processes that can be handled by a computer, including documentation by a word processor, various calculations by spreadsheet software, drawing by a drawing tool and a painting tool, content viewing and editing by various multimedia functions, etc.

Logs-in to the server apparatus 102 may either be a direct log-in or a remote log-in. The former is a mode in which the server apparatus 102 is used via a keyboard, a mouse, and a display that are (virtually) directly connected to the server apparatus 102, and the latter is a mode in which the server apparatus 102 is used via another computer, e.g., the terminal apparatus 105 according to the present embodiment, which is connected to the server apparatus 102 via a computer communication network.

The direct log-in entry receiving unit 203 and the direct processing unit 204 are the components relevant to direct logs-in.

That is, the direct log-in entry receiving unit 203 receives an entry of a user name and a password of a direct user.

The direct processing unit 204 supplies the combination of the entered user name and password to the log-in permission determining unit 201, receives an instruction entry from that direct user if the log-in permission determining unit 201 determines to permit a log-in to the server apparatus 102, supplies the instruction entry to the data processing unit 202, and presents the direct user with the process output that is output from the data processing unit 202 in response to the instruction entry.

With the use of input/output devices using a keyboard, a mouse, and a display, the direct log-in entry receiving unit 203 provides an environment for making a log-in to the server apparatus 102, and the direct processing unit 204 provides an environment for making use of the data processing unit 202.

Other than the above, a file system for encrypting files of a user may take various approaches, including the following one.

(1) When a selection to instruct encryption is made, the server apparatus 102 generates a file system encryption key for the user by random numbers.

(2) Files that are subordinate to a designated directory are encrypted with the generated file system encryption key, which is also used for subsequent file accesses.

(3) The generated file system encryption key is further encrypted with the password of the user and stored in a hard disk.

(4) For the next logs-in where the user's password can be obtained, the file system encryption key is decrypted from the information stored in the hard disk with the obtained password, and the decrypted file system encryption key is used for subsequent file accesses.

(5) When the user changes his/her password, the file system encryption key is encrypted with the changed new password and stored in the hard disk to replace the old one.

The above functions are similar to those used in an ordinary computer system, and various techniques can be used as these functions. The functions specific to the present embodiment will be explained later.

(Flow of Remote Log-In)

Figure 3:
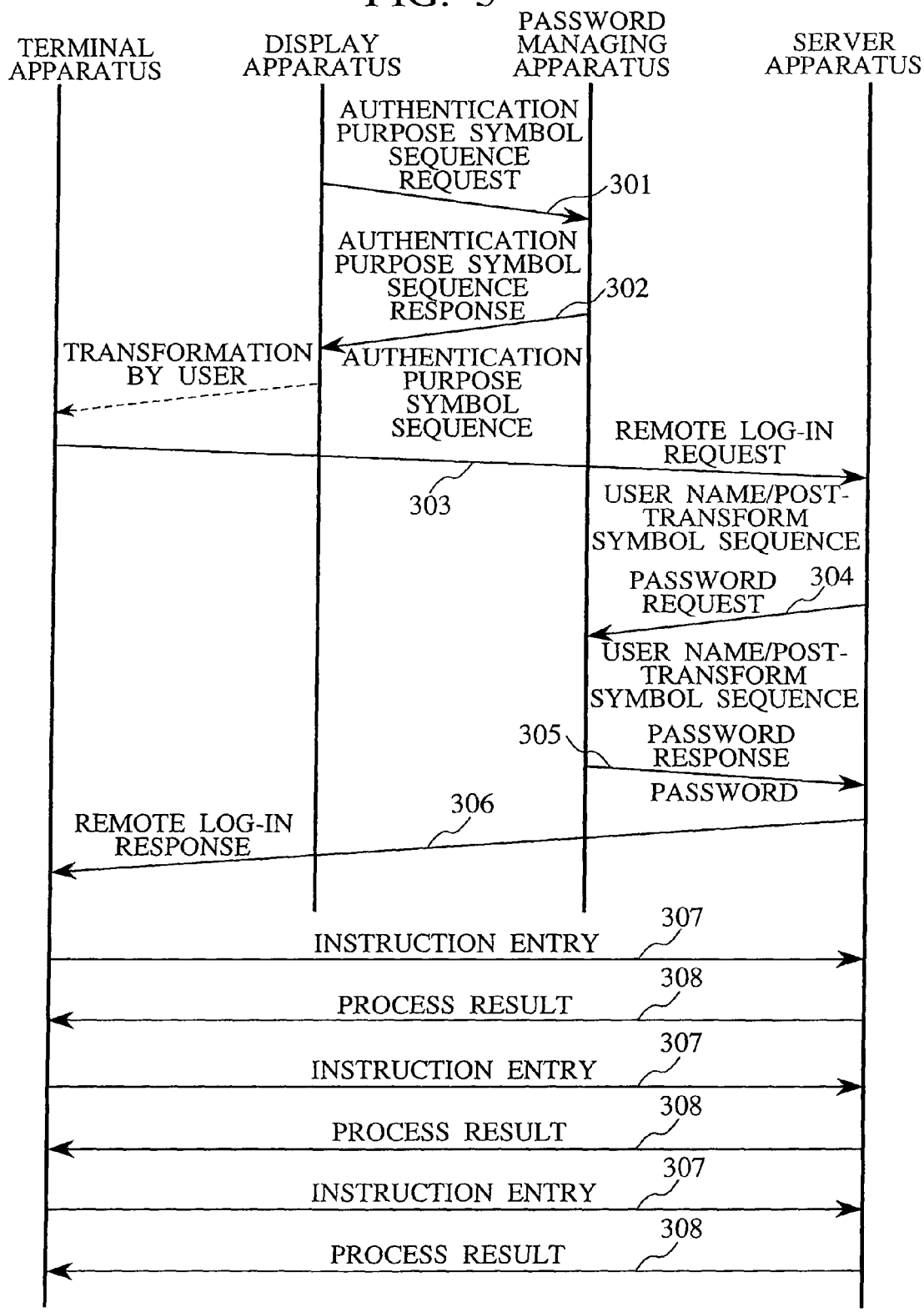
FIG. 3 is a session diagram showing a way in which processes and communications for a terminal apparatus to start a remote log-in to a server apparatus are performed in this embodiment.

FIG. 3 is a session diagram showing the way in which processes and communications for the terminal apparatus 105 to start a remote log-in to the server apparatus 102 are performed in the present embodiment. The following explanation will be given with reference to FIG. 3.

First, the user accesses the password managing apparatus 103 from the display apparatus 104 to send an authentication purpose symbol sequence request (301).

In response, the password managing apparatus 103 generates an authentication purpose symbol sequence by using random numbers, and sends the generated sequence to the display apparatus 104 as an authentication purpose symbol sequence response (302).

Methods for generating an authentication purpose symbol sequence may be the ones below, so various methods can be used.

(p) A method of randomly selecting and arranging a plurality of symbols. A certain number of random numbers that amounts to the length of a necessary authentication purpose symbol sequence are generated, and symbols associated with these random numbers are lined up. It is typical to use pseudo random numbers as the random numbers, but it may be possible to use, e.g., the present time, the phone number of the display device 104, etc. as the seed (this is also the case in the following methods).

(q) A method of randomly selecting any from a plurality of predetermined authentication purpose symbol sequence prospects. A plurality of sequences that are suitable as authentication purpose symbol sequences (e.g., sequences with less redundancy of the symbols included) are prepared beforehand as prospects. Any of these is selected by a random number.

(r) A method of applying a predetermined conversion to the present time. This is a method for expressing the present time information by an ASCII character string, calculating its MD5 value, and obtaining a numeral sequence from the numerals representing the MD5 value.

Upon receiving this, the display apparatus 104 displays the authentication purpose symbol sequence on the screen and shows it to the user.

The user transforms the authentication purpose symbol sequence based on a predetermined transformation rule assigned to the user, which is presented on the screen of the display apparatus 104.

For example, in a case where the authentication purpose symbol sequence is "ghjkasdf", and the predetermined transformation rule is "the letter next in the alphabetical order to the third letter, the alphabet of the eighth letter, and the letter next in the alphabetical order to the fifth letter", the post-transformation symbol sequence obtained by the transformation is "kfb".

Since an authentication purpose symbol sequence is generated randomly each time an authentication purpose symbol sequence request is made, the authentication by this technique is a sort of authentication by a so-called one-time password.

Various techniques including those disclosed in Patent Literature 1, etc. can be used for associating authentication purpose symbol sequences and transformation rules with each other.

Then, the user enters his/her user name and the post-transformation symbol sequence to the terminal apparatus 105 to let the terminal apparatus 105 send a remote log-in request for attempting an access to the server apparatus 102 (303). Receiving this, the server apparatus 102 sends a password request in which the user name and the post-transformation symbol sequence are specified to the password managing apparatus 103 (304).

The password managing apparatus 103 determines whether the post-transformation symbol sequence specified in the received password request coincides or not with the result obtained by applying the transformation rule assigned to the user to an authentication purpose symbol sequence generated earlier (whether a password provision condition is satisfied or not), and in a case where they coincide, sends a password response in which a password stored in the password managing apparatus 103 is specified to the server apparatus 102 (305).

The server apparatus 102 determines whether the password specified in the received password response is valid or not as a log-in password for the user name entered earlier.

Then, when permitting a log-in, the server apparatus 102 sends a remote log-in response for permitting a remote log-in to the terminal apparatus 105 (306).

After this, an instruction entry from the user to the terminal apparatus 105 is sent to the server apparatus 102 (307), and the result of a process performed by the server apparatus 102 is sent to the terminal apparatus 105 (308).

A great difference between the technique disclosed in Patent Literature 1 and the present technique is that a log-in password for the server apparatus 102 is sent from the password managing apparatus 103 (corresponding to "authentication server") to the server apparatus 102 (corresponding to "system of which use is intended"). According to the technique disclosed in Patent Literature 1, only the password managing apparatus 103 determines whether or not to permit use, while according to the present technique, both the password managing apparatus 103 and the server apparatus 102 determine whether or not to permit use based on different determination criteria.

It may not be desirable that a password in a bare state flow through a computer communication network such as the Internet 106, etc. In such a case, the following method may be employed.

That is, the server apparatus 102 encrypts beforehand a password by a predetermined encryption manner, and lets the password managing apparatus 103 store the encrypted password.

Then, the server apparatus 102 obtains the log-in password by decrypting the encrypted password specified in the password response by a decryption manner for the predetermined encryption manner.

At this time, the encryption manner may be for the server apparatus 102 to randomly select letters at the time of user registration, etc. to generate an encryption passphrase and encrypt the password with the encryption passphrase. The encryption passphrase is stored in the hard disk of the server apparatus 102.

The encryption manner may be for the user to select an encryption passphrase at the time of user registration. In this case, the user enters his/her own encryption passphrase when entering his/her user name and the post-transformation symbol sequence.

In the former case, the user is little burdened, because he/she needs only to remember the user name and the transformation rule. The latter case is problematic in that the user has to remember the passphrase too. However, since the server apparatus 102 needs not store the passphrase, authentication information is advantageously dispersed to the respective parties.

(Communication between Password Managing Apparatus and Display Apparatus)

Figure 4:
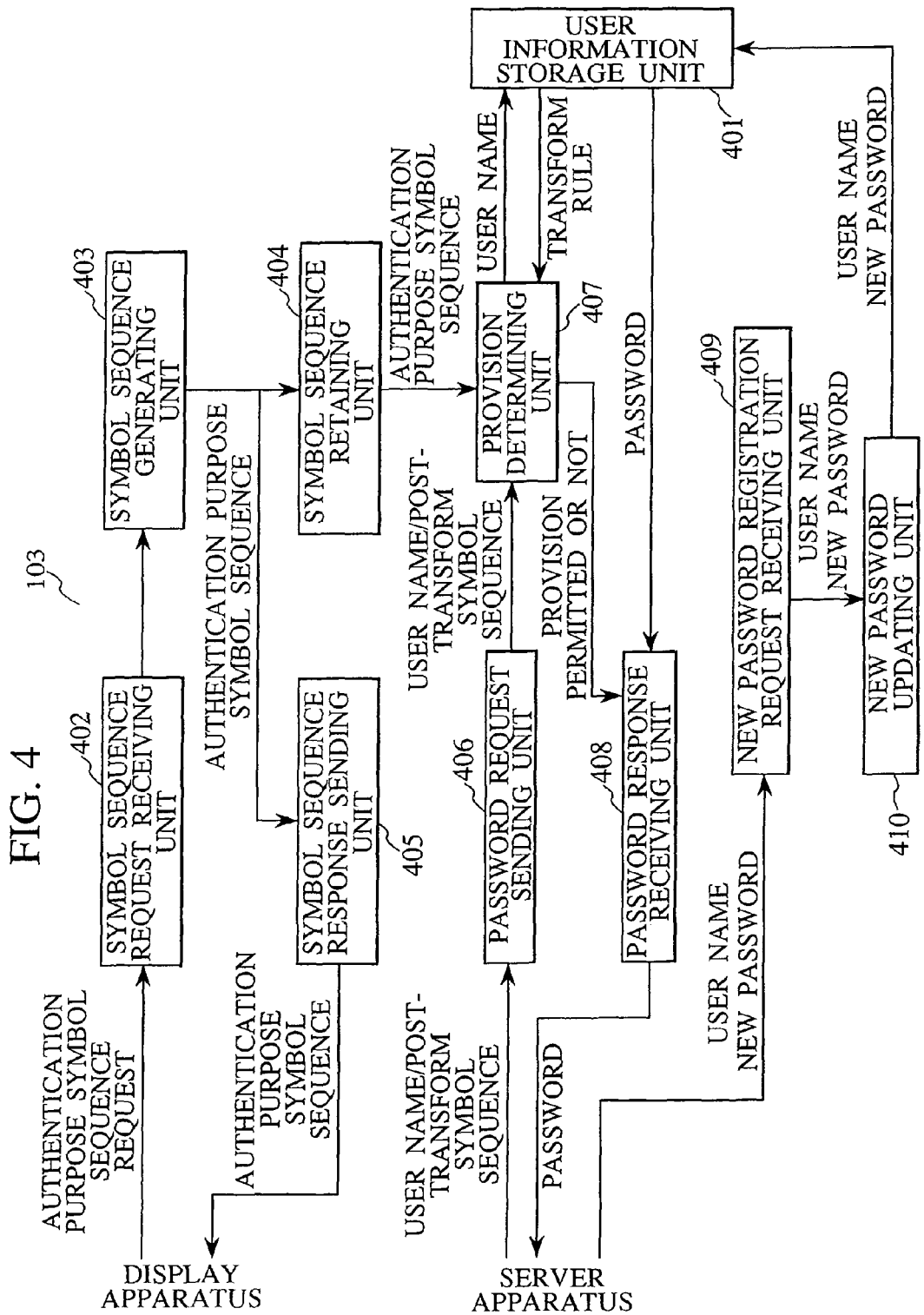
FIG. 4 is an explanatory diagram showing a schematic configuration of a password managing apparatus.
Figure 5:
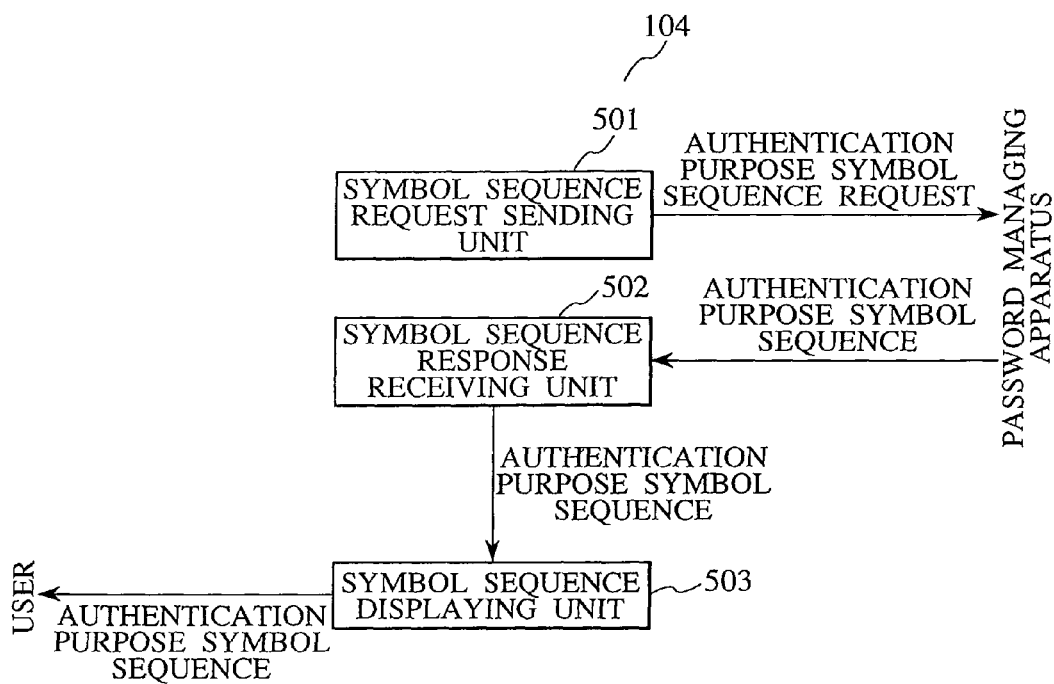
FIG. 5 is an explanatory diagram showing a schematic configuration of a display apparatus.

FIG. 4 is an explanatory diagram showing a schematic configuration of the password managing apparatus 103. FIG. 5 is an explanatory diagram showing a schematic configuration of the display apparatus 104. The following explanation will be given with reference to these diagrams.

The password managing apparatus 103 includes a user information storage unit 401, a symbol sequence request receiving unit 402, a symbol sequence generating unit 403, a symbol sequence retaining unit 404, a symbol sequence response sending unit 405, a password request receiving unit 406, a provision determining unit 407, a password response sending unit 408, a new password registration request receiving unit 409, and a password updating unit 410.

The display apparatus 104 includes a symbol sequence request sending unit 501, a symbol sequence response receiving unit 502, and a symbol sequence displaying unit 503.

The user information storage unit 401 stores a user name, a password assigned to the user name, and a transformation rule assigned to the user name in association.

A user name and a password are for making a log-in and an access to the server apparatus 102, and it is typical that these are the same as, or the encrypted version of, those used for making a direct log-in to the server apparatus 102. A transformation rule is assigned to the user.

In a case where a cellular phone is used as the display apparatus 104, the phone number of the cellular phone may be used as an identifier symbol of the display apparatus 104. That is, the security level can be improved if the phone number of a cellular phone is registered in the user information storage unit 401 so that it is possible to check whether the display apparatus 104 that has sent the authentication purpose symbol sequence request is or is not owned by the user concerned.

The components that are relevant to sending and receiving (301, 302) between the display apparatus 104 and the password managing apparatus 103 will now be explained below.

First, the symbol sequence request sending unit 501 of the display apparatus 104 sends an authentication purpose symbol sequence request to the password managing apparatus 103 (301), and the symbol sequence request receiving unit 402 sends the authentication purpose symbol sequence request sent by the display apparatus 104 (cellular phone or the like).

It is typical that this request is based on the HyperText Transfer Protocol (HTTP) for an Internet service using a cellular phone. In this case, a Common Gateway Interface (CGI) script of the password managing apparatus 103 works on the request sent by the display apparatus 104, which is constituted by an Internet browser of the cellular phone, so that the following process may be performed.

Further, in a case where the display apparatus 104 is configured to let the user enter the user name that is for making a log-in to the server apparatus 102, the user name may be specified in the request.

The symbol sequence generating unit 403 randomly generates an authentication purpose symbol sequence in response to the received authentication purpose symbol sequence request.

The authentication purpose symbol sequence may be one line of random letter sequence as described above, from which an xx-th order letter is extracted and a letter that precedes or succeeds such an extracted letter in the alphabetical order is extracted according to a transformation rule. The authentication purpose symbol sequence may alternatively be a grid formation, e.g., three sets of grids each having three rows and three columns, in which random letters are arranged, and from which letters at predetermined positions are extracted for the user.

The symbol sequence retaining unit 404 retains the generated authentication purpose symbol sequence until a predetermined elapse time passes.

Why the symbol sequence retaining unit 404 retains the authentication purpose symbol sequence until the predetermined elapse time passes is because the authentication purpose symbol sequence will be used for later authentication. The phone number of the cellular phone that functions as the display apparatus 104 (the phone number can be obtained from the HTTP protocol as sender information that specifies the sender of the authentication purpose symbol sequence request), and the user name (in a case where the user entered the user name that is to be used at the server apparatus 102, when sending the authentication purpose symbol sequence request from the display apparatus 104) may be retained together with the authentication purpose symbol sequence.

The symbol sequence response sending unit 405 sends an authentication purpose symbol sequence response in which the generated authentication purpose symbol sequence is specified to the display apparatus 104 (302).

The symbol sequence response receiving unit 502 of the display apparatus 104 receives the authentication purpose symbol sequence response sent by the password managing apparatus 103, and the symbol sequence displaying unit 503 displays the authentication purpose symbol sequence specified in the received authentication purpose symbol sequence response.

In a case where the authentication purpose symbol sequence response is sent as a response to a CGI request, this information is sent in a format that enables the information to be displayed on the browser of the cellular phone, so the authentication purpose symbol sequence is thus displayed on the browser screen of the cellular phone that constitutes the display apparatus 104.

(Communication Between Server Apparatus and Terminal Apparatus)

Figure 6:
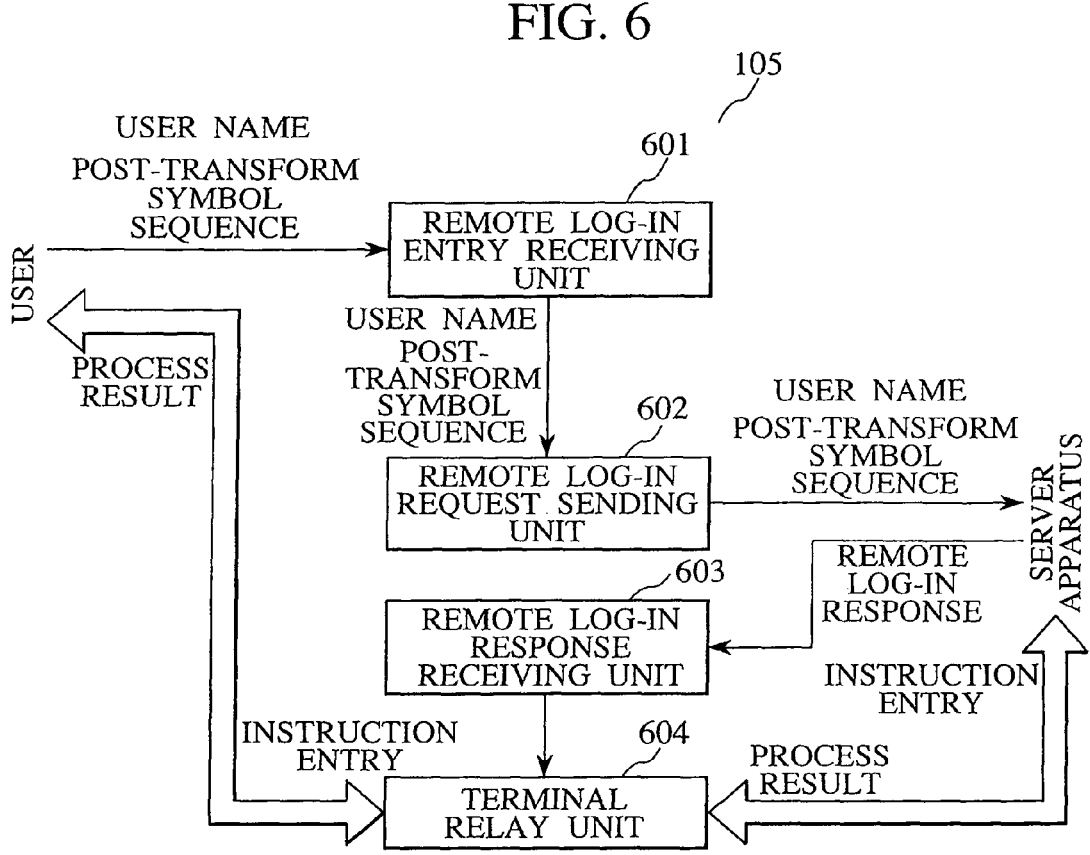
FIG. 6 is an explanatory diagram showing a schematic configuration of a terminal apparatus.

FIG. 6 is an explanatory diagram showing a schematic configuration of the terminal apparatus 105. The following explanation will be given with reference to FIG. 6.

The terminal apparatus 105 includes a remote log-in entry receiving unit 601, a remote log-in request sending unit 602, a remote log-in response receiving unit 603, and a terminal relay unit 604.

As described above, the user who has seen the authentication purpose symbol sequence displayed on the screen of the display apparatus 104 applies his/her own transformation rule to the authentication purpose symbol sequence to obtain a post-transformation symbol sequence.

According to a conventional technique such as telnet or ssh technique, when the user enters his/her user name, password, and passphrase from the terminal apparatus 105 to make a remote log-in to the server apparatus 102 from the terminal apparatus 105, the entered information is transmitted to the server apparatus 102 via the Internet 106 so that the server apparatus 102 may determine whether or not to permit a log-in.

According to some methods, the password and passphrase may be transmitted in a bare state to the server apparatus 102. Meanwhile, a challenge-response approach may be taken in such a way that the server apparatus 102 beforehand prepares a byte sequence, and the terminal apparatus 105 transforms the byte sequence based on the password entered by the user and transmits the post-transformation byte sequence to the server apparatus 102 to let the server apparatus 102 check it.

Since the server apparatus 102 can provide a perfect wrapper for a user of a remote desktop service, a client apparatus in a conventional technique that receives a remote desktop service can just be used without any change as the terminal apparatus 105.

In the present embodiment too, the process by the terminal apparatus 105 follows a similar flow to that described above, the terminal apparatus 105 needs not be equipped with any special components to deal with the details of the determination by the server apparatus 102 of whether or not to permit a log-in.

That is, in the terminal apparatus 105, the remote log-in entry receiving unit 601 receives an entry of the following information.

(a) The user name of the remote user who uses the terminal apparatus 105. The user name is the user name of the user who makes use of the server apparatus 102.

(b) The post-transformation symbol sequence that has been transformed by the remote user, based on the transformation rule assigned to the user name, from the authentication purpose symbol sequence displayed by the display apparatus 104.

Other than these, an encryption passphrase may need to be entered at this stage. It is typical that the remote log-in entry receiving unit 601 is embodied by the keyboard and mouse of the terminal apparatus 105. However, the actual operation can be considered simply as the terminal apparatus 105 transmitting the entered information to the server apparatus 102 and the terminal apparatus 105 displaying the "desktop screen" on its display based on "desktop screen" information sent by the server apparatus 102.

The remote log-in request sending unit 602 sends a remote log-in request in which the user name and the post-transformation symbol sequence are specified to the server apparatus 102 (303), which can be considered, in the above thinking framework, simply as a client program for the remote desktop service operating in the terminal apparatus 105 to transmit the information entered by the user to the server apparatus 102.

When the remote log-in request receiving unit 205 of the server apparatus 102 receives the remote log-in request sent by the terminal apparatus 105, it is determined based on the log-in request whether or not to permit a log-in, and a log-in response is sent to the terminal apparatus 105 (306).

As will be described later, the determination of whether or not to permit a log-in is performed by a process between the server apparatus 102 and the password managing apparatus 103. Therefore, the user of the terminal apparatus 105 can switch to the technique of the present invention without feeling uncomfortable because the present technique is not greatly different from conventional remote desktop services.

It is possible to employ a method that determines the remote log-in as a success if the remote log-in response receiving unit 603 of the terminal apparatus 105 receives the remote log-in response sent by the server apparatus 102, or it is possible to employ a method that includes a statement of whether the log-in is successful or not in the remote log-in response. These methods may follow a similar manner to the log-in process of a remote desktop, telnet, ssh, etc.

After this, in a case where the remote log-in by the remote user who uses the terminal apparatus 105 is successful, the terminal relay unit 604 receives an instruction entry directed by the remote user to the server apparatus 102 from the remote user, relays the instruction entry to the server apparatus 102 (307), then the remote processing unit 209 of the server apparatus 102 supplies this instruction entry to the data processing unit 202 and sends a resulting process output to the terminal apparatus 105 (308), and the terminal relay unit 604 receives the process output and presents it to the remote user.

That is, the remote processing unit 209 intermediates between the remote user and the data processing unit 202, and the direct processing unit 204 intermediates between a direct user and the data processing unit 202.

(Communication Between Password Managing Apparatus and Server Apparatus)

A method by which the password managing apparatus 103 and the server apparatus 102 determine whether or not to permit a remote log-in will be explained below.

As described above, in the server apparatus 102 that has received the log-in request from the terminal apparatus 105, the password request sending unit 206 sends a password request in which the user name and the post-transformation symbol sequence that are specified in the received remote log-in request are specified to the password managing apparatus 103 (304).

As described above, the log-in request specifies the user name and the post-transformation symbol sequence entered by the user from the terminal apparatus 105, and the post-transformation symbol sequence is a result of applying the transformation rule assigned to the user to the authentication purpose symbol sequence that the password managing apparatus 103 has randomly generated. Hence, the server apparatus 102 makes the password managing apparatus 103 check the condition for permitting or not permitting a log-in by using these pieces of information.

In the password managing apparatus 103, the password request receiving unit 406 receives the password request sent by the server apparatus 102.

Then, the provision determining unit 407 determines whether or not a password provision condition is satisfied or not. Various patterns as shown below can be considered concerning the password provision condition.

(a) A case where an authentication purpose symbol sequence that is randomly generated is only used. A generated authentication purpose symbol sequence is retained in the symbol sequence retaining unit 404 only for a certain period of time. Hence, in general, one or a plurality of authentication purpose symbol sequence(s) is/are retained in the symbol sequence retaining unit 404.

The transformation rule stored in the user information storage unit 401 in association with the user name specified in the password request is applied to the one authentication purpose symbol sequence or each of the plurality of authentication purpose symbol sequence that is/are retained. If any of the results of the rule application coincides with the post-transformation symbol sequence specified in the password request, the password provision condition is satisfied.

(b) A case where the user name entered from the display apparatus 104 is used. The symbol sequence retaining unit 404 needs to retain the user name entered from the display apparatus 104 in association with the authentication purpose symbol sequence that is randomly generated.

In this case, the transformation rule stored in the user information storage unit 401 in association with the user name specified in the password request is applied to the authentication purpose symbol sequence that is retained in the symbol sequence retaining unit 404 in association with the same user name as the user name specified in the password request. If the result of the rule application coincides with the post-transformation symbol sequence specified in the password request, the password provision condition is satisfied.

(c) A case where the identifier symbol of the display apparatus 104 such as the phone number or the like of the cellular phone used as the display apparatus 104 is used. The symbol sequence retaining unit 404 needs to retain the phone number or the like in association with the authentication purpose symbol sequence that is randomly generated. The user information storage unit 401 stores the phone number of the cellular phone used by each user in association with the user name.

"The transformation rule stored in the user information storage unit 401 in association with the user name specified in the password request" is applied to the "authentication purpose symbol sequence retained in the symbol sequence retaining unit 404 in association with 'the phone number that is stored in the user information storage unit 401 in association with the user name specified in the password request'". If the result of the rule application coincides with the post-transformation symbol sequence specified in the password request, the password provision condition is satisfied.

In a case where the password provision condition is satisfied, the password response sending unit 408 acquires the password that is stored in the user information storage unit 401 in association with the user name specified in the password request (the password is the one that can be used for making a direct log-in to the server apparatus 102, or the encrypted password obtained by encrypting this), and sends a password response in which the acquired password is specified to the server apparatus 102 (305).

In a case where the password provision condition is not satisfied, the password response may state to that effect or no password response may be returned.

In the server apparatus 102, the password response receiving unit 207 receives the password response sent by the password managing apparatus 103.

In a case where a password response in which a bare log-in password is specified is transmitted between the server apparatus 102 and the password managing apparatus 103 via the Internet 106, it is desirable that it be appropriately encrypted with a Secure Socket Layer (SSL) or the like.

The password response receiving unit 207 then supplies the combination of the user name specified in the received remote log-in request and the password specified in the received password response to the log-in permission determining unit 201.

The log-in permission determining unit 201 receives the user name and password that are entered form the keyboard in the case of a direct log-in, while in the case of a remote log-in, receives the user name sent by the terminal apparatus 105 and the password sent by the password managing apparatus 103 (if the password is the encrypted password, to be received by the log-in permission determining unit 201 is the password decrypted in the server apparatus 102).

As can be known, the final determination of whether or not to permit a log-in is made by the server apparatus 102. In a case where it is determined to permit a log-in to the server apparatus 102, the remote log-in response sending unit 208 sends a remote log-in response for permitting a remote log-in to the terminal apparatus 105 (307).

As described above, when an encrypted password is used, it is necessary to prepare an encryption passphrase used for encrypting and decrypting the password. The server apparatus 102 may randomly generate an encryption passphrase for each user by using random numbers at the time of user registration, or it may be the user who decides an encryption passphrase to be used so the user may enter one to the terminal apparatus 105 when making a log-in request.

Since it is necessary that the password encryption/decryption be wholly performed within the server apparatus 102 (plus the terminal apparatus 105, as the case may be), it is possible to employ a public key encryption system, etc., and various encryption systems conventionally widely used.

As obvious from the above, the present embodiment is advantageous in that the system can be readily provided for use by any kinds of users, because it is only necessary to prepare a remote log-in wrapper for the server apparatus 102 that is direct log-in acceptable and the system environment can be left unchanged.

The confidential level of a password for making a direct log-in can be appropriately changed depending on the environment of use. For example, in a case where the server apparatus 102 and the password managing apparatus 103 are managed by different bodies, it is possible to keep "the very password itself of the server apparatus 102" unknown to the managing body of the password managing apparatus 103. Therefore, it is possible to consider that personal information can be appropriately managed.

The following explanation will describe a process for newly registering a password of a given user, according to an embodiment in which a password of a user that is to be stored in the password managing apparatus 103 is an encrypted password.

When a user has once gained access to the server apparatus 102 by making a direct log-in or a remote log-in, or when the managing body of the server apparatus 102 registers a new user, the new password entry receiving unit 210 of the server apparatus 102 receives an entry of a user name and a password newly assigned to the user name. This includes new user registration cases and password changing cases. It is desirable that both the old password and the new password be entered, likewise in the conventional password changing process.

Then, the new password registration request sending unit 211 encrypts the newly assigned password by the predetermined encryption manner to generate a new encrypted password, and sends a new password registration request in which the entered user name and the new encrypted password are specified to the password managing apparatus 103.

Once the password database in the server apparatus 102 is updated, the log-in permission determining unit 201 permits a log-in to the server apparatus 102 when a combination of an entered user name and an entered newly assigned password are supplied thereto.

The new password registration request receiving unit 409 of the password managing apparatus 103 receives the new password registration request sent by the server apparatus 102.

The new password updating unit 410 updates the user information storage unit 401 by storing the user name specified in the received new password registration request in association with the encrypted password specified in the received new password registration request.

This is the basic flow of password changing, but this flow may include authentication by an authentication purpose symbol sequence, which involves the display apparatus 104. That is, (1) the password managing apparatus 103 receives a new password registration request from the server apparatus 102, (2) the password managing apparatus 103 randomly generates an authentication purpose symbol sequence and sends it to the server apparatus 102, (3) the server apparatus 102 presents the authentication purpose symbol sequence to the user, (4) the user enters his/her user name and a post-transformation symbol sequence obtained by transforming the authentication purpose symbol sequence according to his/her transformation rule to the cellular phone to send them to the password managing apparatus 103, (5) the password managing apparatus 103 checks the user name and post-transformation symbol sequence sent by the cellular phone in the same way as in the case of a remote log-in, and (6) if the checking is successful, the new password is registered.

That is, in this embodiment, the respective pieces of information are directed in the opposite way to the above-described embodiment to perform authentication and check whether it is permissible to update the password.

The server apparatus 102 and the password managing apparatus 103 of the present embodiment can be embodied by running a predetermined server program on a general business-use computer. The display apparatus 104 can be embodied by an apparatus such as a cellular phone on which an Internet browser can operate. The terminal apparatus 105 can be embodied by an Internet access terminal or the like that is prepared in an Internet café, etc. Hence, each of these apparatuses can be embodied by making a Central Processing Unit (CPU) provided in hardware execute a predetermined program, and using a Random Access Memory (RAM), a hard disk, an Electrically Erasable Programmable Read Only Memory (EEPROM), a flash memory, or the like as a temporary storage area or a nonvolatile storage area.

In the above-described embodiment, the display apparatus 104 is a cellular phone and the terminal apparatus 105 is a computer that is provided at an Internet café, etc. However, for example, in a case where a user wants to access the server apparatus 102 when he/she is outside his/her place, by using his/her own laptop computer and any Internet access provider, the functions of both the display apparatus 104 and the terminal apparatus 105 may be embodied on the same machine (in this example, the laptop computer). This embodiment is suitable for a case where the password managing apparatus 103 also serves as an Internet access provider or it serves as a so-called portal site.

In the above-described embodiment, a generated authentication purpose symbol sequence is simply transmitted between the password managing apparatus 103 and the display apparatus 104. However, the following method may be employed.

That is, the password managing apparatus 103 and the display apparatus 104 share a common function that, when given a seed, generates a unique authentication purpose symbol sequence from the seed. For example, a random sequence generation algorithm will generate the same random sequence from the same seed. Hence, a function that realizes a random sequence generation algorithm is used as a common random number to be shared.

Then, either one of the password managing apparatus 103 and the display apparatus 104 randomly selects a seed, and sends the seed to the other. Then, both of them apply the function to the seed to generate an authentication purpose symbol sequence and obtain an authentication purpose symbol sequence that is common between them.

This method can improve the security level even more by appropriately changing the function.

According to the present invention, it is possible to provide an information processing system suitable for safe password authentication by a password managing apparatus on a terminal apparatus that makes a remote log-in to a server apparatus, and a computer-readable information recording medium that stores a program for realizing the server apparatus or the password managing apparatus that constitutes the information processing system.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2006-243761 filed on Sep. 8, 2006 and including specification, claims, drawings and summary. The disclosure of the above Japanese Patent Application is incorporated herein by reference in its entirety.

What is claimed is:

1. An information processing system, comprising:
a server apparatus;
a password managing apparatus;
a display apparatus; and
a terminal apparatus,
wherein said display apparatus and said password managing apparatus communicate with each other via a first communication path, said password managing apparatus and said server apparatus communicate with each other via a second communication path which is secure, said server apparatus and said terminal apparatus communicate with each other via a third communication path, and said first, second and third communication paths are independent from one another, wherein
(a) said server apparatus includes:
a log-in permission determining unit that determines whether or not to permit a log-in to said server apparatus based on a combination of a user name and a password that are supplied thereto;
a data processing unit that, in response to an instruction entry that is given by a user who is permitted by said log-in permission determining unit to log in, performs data processing corresponding to the instruction entry, and outputs a result of the data processing as a process output;
a direct log-in entry receiving unit that receives an entry of a user name and a password of a direct user; and a direct processing unit that supplies a combination of the user name and the password that are entered to said log-in permission determining unit, and when it is determined that a log-in to said server apparatus is permitted, receives an instruction entry from the direct user, supplies the instruction entry to said data processing unit, and presents the direct user with a process output that is output by said data processing unit in response to the instruction entry, (b) said password managing apparatus includes a user information storage unit that stores a user name, an encrypted password assigned to the user name, and a transformation rule assigned to the user name in association, (c) said display apparatus includes a symbol sequence request sending unit that sends an authentication purpose symbol sequence request to said password managing apparatus, (d) said password managing apparatus further includes:
  a symbol sequence request receiving unit that receives the authentication purpose symbol sequence request sent by said display apparatus;
  a symbol sequence generating unit that generates an authentication purpose symbol sequence in response to the received authentication purpose symbol sequence request;
  a symbol sequence retaining unit that retains the generated authentication purpose symbol sequence until a predetermined elapse time passes; and
  a symbol sequence response sending unit that sends an authentication purpose symbol sequence response in which the generated authentication purpose symbol sequence is specified to said display apparatus, (e) said display apparatus further includes:
  a symbol sequence response receiving unit that receives the authentication purpose symbol sequence response sent by said password managing apparatus; and a symbol sequence displaying unit that displays the authentication purpose symbol sequence specified in the received authentication purpose symbol sequence response, (f) said terminal apparatus includes:
  a remote log-in entry receiving unit that receives an entry of a user name of a remote user who uses said terminal apparatus, and of a post-transformation symbol sequence that is obtained by the remote user by transforming the authentication purpose symbol sequence displayed on said display apparatus based on a transformation rule memorized by the remote user; and
  a remote log-in request sending unit that sends a remote log-in request in which the user name and the post-transformation symbol sequence that are entered are specified to said server apparatus, (g) said server apparatus further includes:
  a remote log-in request receiving unit that receives the remote log-in request sent by said terminal apparatus; and
  a password request sending unit that sends a password request in which the user name and the post-transformation symbol sequence that are specified in the received remote log-in request are specified to said password managing apparatus, (h) said password managing apparatus further includes:
  a password request receiving unit that receives the password request sent by said server apparatus;
  a provision determining unit that determines whether a password provision condition is satisfied or not; and
  a password response sending unit that, in a case where it is determined that the password provision condition is satisfied, sends a password response in which the encrypted password that is stored in association with the user name specified in the received password request is specified to said server apparatus,
  wherein the password provision condition is satisfied in a case where any of results of applying the transformation rule stored in association with the user name specified in the received password request to each of authentication purpose symbol sequences that are retained coincides with the post-transformation symbol sequence specified in the received password request, (i) said server apparatus further includes:
  a password response receiving unit that receives the password response sent by said password managing apparatus; and
  a remote log-in response sending unit that supplies a combination of the user name specified in the received remote log-in request and a password which is obtained by decrypting the encrypted password specified in the received password response using a predefined decryption associated with a predefined encryption to said log-in permission determining unit, and sends a remote log-in response for permitting a remote log-in to said terminal apparatus, in a case where said log-in permission determining unit determines to permit a log-in to said server apparatus, (j) said terminal apparatus further includes:
  a remote log-in response receiving unit that receives the remote log-in response sent by said server apparatus; and
  a terminal relay unit that, in a case where a remote log-in by the remote user who uses said terminal apparatus is successful, receives an instruction entry directed by the remote user to said server apparatus from the remote user, relays the instruction entry to said server apparatus, receives a process output directed by said server apparatus to the remote user from said server apparatus, and presents the process output to the remote user,
  wherein said terminal relay unit determines that a remote log-in by the remote user who uses said terminal apparatus is successful, in a case where the remote log-in response is received, (k) said server apparatus further includes a remote processing unit that supplies the instruction entry from the remote user that is relayed by said terminal apparatus to said data processing unit, and relays the process output that is output by said data processing unit in response to the instruction entry to said terminal apparatus to present the process output to the remote user (l) said server apparatus further includes
  a new password entry receiving unit that receives an entry of a user name and a password that is newly assigned to the user name; and
  a new password registration request sending unit that sends a new password registration request in which the entered user name, and a new encrypted password obtained by encrypting the entered newly assigned password by the predetermined encryption are specified to said password managing apparatus,
  wherein said log-in permission determining unit determines to permit a log-in to said server apparatus, in a case where it is supplied with a combination of the entered user name and the entered newly assigned password, (m) said password managing apparatus further includes:
a new password registration request receiving unit that receives the new password registration request sent by said server apparatus;
a first means that generates a new password registration authentication purpose symbol sequence in response to the received new password registration request;
a second means that retains the use name and the new encrypted password specified in the received new password registration request in association with the generated new password registration authentication purpose symbol sequence; and
a third means that sends the generated new password registration authentication purpose symbol sequence to said server apparatus;

(n) said server apparatus further includes:
a fourth means that receives the new password registration authentication purpose symbol sequence sent from said password managing apparatus; and
a fifth means that displays the received new password registration authentication purpose symbol sequence;

(o) said display apparatus further includes:
a sixth means that receives an entry of a new password registration purpose user name and a new password registration purpose post-transformation symbol sequence; and
a seventh means that sends the new password registration purpose user name and the new password registration purpose post-transformation symbol sequence that are entered, and (p) said password managing apparatus further includes:
an eighth means that receives the new password registration purpose user name and the new password registration purpose post-transformation symbol sequence from said display apparatus; and
a new password updating unit that updates said user information storage unit by storing the received new password registration purpose user name in association with the new encrypted password retained in association with the received new password registration purpose user name if a result of applying the transformation rule stored in association with the received new password registration purpose user name to the new password registration authentication purpose symbol sequence retained in association with the received new password registration purpose user name coincides with the received new password registration purpose post-transformation symbol sequence.

2. The information processing system according to claim 1, wherein in said password managing apparatus, said symbol sequence generating unit generates the authentication purpose symbol sequence by
(x) randomly selecting and arranging a plurality of symbols, or
(y) randomly selecting any of a plurality of predetermined authentication purpose symbol sequence prospects, or
(z) applying a predetermined conversion to a present time.

3. The information processing system according to claim 1 or 2,
wherein if said new password entry receiving unit receives an entry via said terminal apparatus from the remote user, said server apparatus presents the new password registration authentication symbol sequence via said terminal apparatus to the remote user.

4. The information processing system according to claim 1 or 2,
wherein if said new password entry receiving unit receives an entry from the direct user, said server apparatus presents the new password registration authentication symbol sequence via a display screen connected directly to said server apparatus to the direct user.

5. The information processing system according to claim 1, wherein the predetermined encryption is performed based on a passphrase assigned to the user concerned,
in said terminal apparatus, said remote log-in entry receiving unit receives an entry of a passphrase assigned to the user concerned, in addition to an entry of the user name and the post-transformation symbol sequence, and
said remote log-in response sending unit supplies a combination of the user name specified in the received remote log-in request, and a decrypted password obtained by decrypting the encrypted password specified in the received password response based on the entered passphrase to said log-in permission determining unit.

6. The information processing system according to claim 1, wherein in said password managing apparatus, said user information storage unit further stores, in association with the user name, an identifier symbol of said display apparatus assigned to the user name, said symbol sequence retaining unit retains the generated authentication purpose symbol sequence in association with the identifier symbol of a sender of the received authentication purpose symbol sequence request, and the password provision condition is satisfied in a case where a result of applying the transformation rule stored in association with the user name specified in the received password request to the authentication purpose symbol sequence retained in association with the identifier symbol stored in association with the user name specified in the received password request coincides with the post-transformation symbol sequence specified in the received password request.

7. The information processing system according to claim 1, wherein said terminal apparatus further functions as said display apparatus.

8. A non-transitory computer-readable information recording medium that stores a program for controlling a computer to function as each unit of said server apparatus in said information processing system according to claim 1.

9. A non-transitory computer-readable information recording medium that stores a program for controlling a computer to function as each unit of said password managing apparatus in said information processing system according to claim 1.

* * * * *